United States Patent [19]

Rubin

[11] Patent Number: 4,636,373

[45] Date of Patent: Jan. 13, 1987

[54] SYNTHESIS OF CRYSTALLINE SILICATE ZSM-12 USING DIBENZYLDIMETHYLAMMONIUM CATIONS AND THE PRODUCT PRODUCED

[75] Inventor: Mae K. Rubin, Bala Cynwyd, Pa.

[73] Assignee: Mobil Oil Corporation, New York, N.Y.

[21] Appl. No.: 770,941

[22] Filed: Aug. 30, 1985

Related U.S. Application Data

[63] Continuation-in-part of Ser. No. 624,562, Jun. 26, 1984, abandoned.

[51] Int. Cl.$^4$ ............................................. C01B 33/28
[52] U.S. Cl. ...................................... 423/328; 423/329; 423/330; 423/332; 423/333; 423/335; 423/339; 502/60; 502/62; 502/77; 502/232
[58] Field of Search ................................ 423/326–333, 423/335; 502/62, 71, 77, 150, 162

[56] References Cited

U.S. PATENT DOCUMENTS

| | | | |
|---|---|---|---|
| 4,296,083 | 10/1981 | Rollmann | 423/329 |
| 4,391,785 | 7/1983 | Rosinski et al. | 423/329 |
| 4,552,738 | 11/1985 | Rubin | 423/328 |
| 4,552,739 | 11/1985 | Kuhl | 423/328 |
| 4,585,637 | 4/1986 | Rubin | 502/62 |
| 4,585,639 | 4/1986 | Szostak | 502/77 |
| 4,585,746 | 4/1986 | Valyocsik | 502/77 |

FOREIGN PATENT DOCUMENTS

| | | | |
|---|---|---|---|
| 0013630 | 7/1980 | European Pat. Off. | 423/328 |
| 0112006 | 6/1984 | European Pat. Off. | 502/77 |
| 0136068 | 4/1985 | European Pat. Off. | 502/77 |
| 0159845 | 10/1985 | European Pat. Off. | 502/77 |

OTHER PUBLICATIONS

B. M. Lok et al, "The Role of Organic Molecules in Molecular Sieve Synthesis", *Zeolites*, vol. 3, Oct. 1985, pp. 282–291.

R. B. La Pierre et al, "The Framework Topology of ZSM-12; A High Silica Zeolite", *Zeolites*, vol. 5, No. 6, Nov. 1985, pp. 346–348.

*Primary Examiner*—John Doll
*Assistant Examiner*—Jackson Leeds
*Attorney, Agent, or Firm*—Alexander J. McKillop; Michael G. Gilman; Dennis P. Santini

[57] ABSTRACT

This invention relates to a new and improved form of crystalline silicate identified as zeolite ZSM-12, to a new and useful improvement in synthesizing said crystalline silicate and to use of said crystalline silicate prepared in accordance herewith as a catalyst for organic compound, e.g. hydrocarbon compound, conversion.

13 Claims, No Drawings

SYNTHESIS OF CRYSTALLINE SILICATE ZSM-12 USING DIBENZYLDIMETHYLAMMONIUM CATIONS AND THE PRODUCT PRODUCED

CROSS-REFERENCE TO RELATED APPLICATION

This is a continuation-in-part of application Ser. No. 624,562, filed June 26, 1984 now abandoned.

BACKGROUND OF THE INVENTION

1. Field Of The Invention

This invention relates to a new and improved form of crystalline silicate ZSM-12, to a new and useful improvement in synthesizing said crystalline silicate and to use of the crystalline silicate prepared in accordance herewith as a catalyst for organic compound, e.g. hydrocarbon compound, conversion.

More particularly, this invention relates to an improved method of preparing crystalline silicate ZSM-12 whereby synthesis is facilitated and reproducible and the silicate product exhibits high purity and catalytic utility.

2. Discussion Of Prior Art

Crystalline silicate ZSM-12 and its conventional preparation are taught by U.S. Pat. No. 3,832,449, the entire disclosure of which is incorporated herein by reference. It has a distinctive X-ray diffraction pattern which identifies it from other known crystalline silicates.

U.S. Pat. No. 4,391,785 teaches a method for synthesis of zeolite ZSM-12 from a reaction mixture comprising, as a directing agent, a compound selected from the group consisting of dimethyl pyridinium halide and dimethyl pyrrolidinium halide. U.S. Pat. No. 4,296,083 claims synthesizing zeolites characterized by a constraint index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine. U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,112,056 teaches a synthesis method for ZSM-12 from a reaction mixture containing tetraethylammonium ions as directions agent. U.S. Pat. No. 4,452,769 claims a method for synthesizing ZSM-12 from a reaction mixture containing methyltriethylammonium ions as the directing agent. European Patent Application 13,630 claims synthesis of ZSM-12 from a reaction mixture containing a directing agent defined as an organic compound containing nitrogen and comprising "an alkyl or aryl group having between 1 and 7 carbon atoms, at least one of which comprises an ethyl radical".

Applicant knows of no prior art methods for preparing crystalline silicate ZSM-12 utilizing the present improved method.

SUMMARY OF THE INVENTION

An improved reproducible method for preparing an improved crystalline silicate identified as zeolite ZSM-12 over an unusually wide range of aluminum content exhibiting high purity, high crystallinity, catalytic activity and other valuable properties is provided. The method comprises forming a reaction mixture containing sources of alkali metal cations, dibenzyldimethylammonium cations, an oxide of silicon and water and having a composition, in terms of mole ratios, within the following ranges:

|  | Broad | Preferred |
|---|---|---|
| $Al_2O_3/SiO_2$ | Approximately 0 | Approximately 0 |
| $H_2O/SiO_2$ | 5–50 | 10–40 |
| $OH^-/SiO_2$ | 0.03–0.4 | 0.04–0.2 |
| $M/SiO_2$ | 0.03–0.4 | 0.04–0.2 |
| $R/SiO_2$ | 0.05–1.0 | 0.06–0.4 | wherein M is said alkali metal cation and R is said dibenzyldimethylammonium cation, and maintaining the mixture until crystals of alkali metal and dibenzyldimethylammonium-containing ZSM-12 are formed. By this method, ZSM-12 is synthesized from a reaction mixture with an $Al_2O_3/SiO_2$ molar ratio of about 0 or as reasonably close thereto as possible. To obtain this, no alumina source is added to the reaction mixture as a source of alumina. The only alumina present, if any, occurs as an impurity in other reaction mixture components. The quantity of $OH^-$ is calculated only from the inorganic sources of alkali without any organic base contribution. Thereafter, the product alkali metal and dibenzylammonium-containing ZSM-12 crystals are separated from the liquid and recovered.

Reaction conditions required consist of heating the foregoing reaction mixture to a temperature of from about 80° C. to about 180° C. for a period of time of from about 6 hours to about 200 days. A more preferred temperature range is from about 100° C. to about 160° C. with the amount of time at a temperature in such range being from about 48 hours to about 50 days.

The digestion of the gel particles is carried out until crystals form. The solid product is separated from the reaction medium, as by cooling the whole to room temperature, filtering and water washing.

EMBODIMENTS

The entire contents of application Ser. No. 624,562, of which this is a continuation-in-part, are incorporated herein by reference.

Zeolite ZSM-12 synthesized under conventional procedure is proven to have catalytic application. When the crystalline silicate is synthesized in accordance with the present method, it exhibits high purity and high crystallinity with no contamination from other silicates, e.g. ZSM-5, and catalytic activity for certain conversions of interest, including cracking of hydrocarbons and hydrocracking. The ZSM-12 synthesized hereby has a higher silica/alumina molar ratio range than conventionally prepared ZSM-12, allowing for tailoring that ratio to suit specific purposes. The present method proves to be reproducible and easy to carry out.

The particular effectiveness of the presently required different organic directing agent, i.e. the dibenzyldimethylammonium compound, when compared with other directing agents, such as those identified above, is believed due to its ability to function as a template in the nucleation and growth of zeolite ZSM-12 crystals from the above reaction mixture. This different organic directing agent functions in this fashion to provide a crystalline ZSM-12 product free from contamination with other silicates, such as ZSM-5. A further economy is realized by the present method when the directing agent is derived in situ from combination of dimethylbenzylamine and benzyl halide in the reaction mixture. The reaction product of these two reagents is the dibenzyldimethylammonium compound (halide, e.g. chloride) directing agent required by the present invention.

The organic directing agent required of the present method is dibenzyldimethylammonium. Dibenzyldimethylammonium cations may be provided by, as non-limiting examples, the hydroxide or the halide, e.g. chloride, bromide or iodide, or the in situ reaction of dimethylbenzylamine and benzyl chloride.

The reaction mixture composition for the synthesis of synthetic crystalline silicate hereby can be prepared utilizing materials which can supply the appropriate oxide. Such compositions include silicates, silica hydrosol, silica gel, silicic acid and hydroxides. It will be understood that each oxide component utilized in the reaction mixture for preparing zeolite ZSM-12 can be supplied by one or more essential reactants and they can be mixed together in any order. For example, any oxide can be supplied by an aqueous solution, sodium hydroxide or by an aqueous solution of a suitable silicate; the organic cation can be supplied by the compound of that cation, such as, for example, the hydroxide or a salt, e.g. halide, such as chloride or bromide. The reaction mixture can be prepared either batchwise or continuously. Crystal size and crystallization time for the zeolite ZSM-12 composition will vary with the exact nature of the reaction mixture employed. In general, the crystal morphology of the ZSM-12 synthesized hereby is of acicular type.

The zeolite ZSM-12 composition as prepared hereby can be identified, in terms of mole ratios of oxides and in the anhydrous state, as follows:

(0.5 to 3.0)$R_2O$:(0.1 to 1.0)$M_{2/n}O$:
(0.02 to 1.0)$Al_2O_3$:(100)$SiO_2$ wherein M is at least one cation having a valence n and R is the cation derived from the dibenzyldimethylammonium compound.

The original cations, e.g. alkali metal, can be replaced, at least in part, by calcination and/or ion exchange with another cation. Thus, the original cations are exchanged into a hydrogen or hydrogen ion precursor form or a form in which the original cation has been replaced by a metal of Groups IIA, IIIA, IVA, IB, IIB, IIIB, IVB, VIB or VIII of the Periodic Table. Thus, for example, it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

The X-ray diffraction pattern of the crystalline silicate product of the present invention has the characteristic lines shown in Table 1.

TABLE 1

| Interplanar d-Spacing (A) | Relative Intensity (I/$I_o$) |
| --- | --- |
| 11.9 ± 0.2 | m |
| 10.1 ± 0.2 | m |

TABLE 1-continued

| Interplanar d-Spacing (A) | Relative Intensity (I/$I_o$) |
| --- | --- |
| 4.76 ± 0.1 | w |
| 4.29 ± 0.08 | vs |
| 3.98 ± 0.08 | m |
| 3.87 ± 0.07 | vs |
| 3.49 ± 0.07 | w |
| 3.38 ± 0.07 | m |
| 3.20 ± 0.06 | w |
| 3.05 ± 0.05 | w |
| 2.54 ± 0.03 | w |

These values were determined by standard technique. The radiation was the K-alpha doublet of copper, and a diffraction equipped with a scintillation counter and a strip chart pen recorder was used. The peak heights, I, and the positions as a function of two times theta, where theta is the Bragg angle, were read from the spectrometer chart. From these, the relative intensities, 100 I/$I_o$ where $I_o$ is the intensity of the strongest line or peak, and d (obs.), the interplanar spacing in Angstrom units (A) corresponding to the recorded lines, were calculated. In Table 1 the relative intensities are given in terms of the symbols w=weak, m=medium, vs=very strong, etc. Ion exchange of the sodium ions with cations reveals substantially the same pattern with some minor shifts in interplanar spacing and variation in relative intensity. Other minor variations can occur depending on the silicon to aluminum ratio of the particular sample, as well as if it has been subjected to thermal treatment.

While the improved crystalline silicate of the present invention may be used in a wide variety of organic compound, e.g. hydrocarbon compound, conversion reactions, it is notably useful in the processes of catalytic cracking and hydrocracking when combined with a hydrogenation component. Other conversion processes for which improved zeolite ZSM-12 may be utilized in one or more of its active forms include, for example, olefin or aromatic isomerization.

Synthetic zeolite ZSM-12 prepared in accordance herewith can be used either in the organic nitrogen-containing and alkali metal containing form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to zeolite ZSM-12 such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

Synthetic zeolite ZSM-12, when employed either as an adsorbent or as a catalyst in a hydrocarbon conversion process, should be dehydrated at least partially. This can be done by heating to a temperature in the range of from about 200° C. to about 600° C. in an inert atmosphere, such as air, nitrogen, etc. and at atmospheric or subatmospheric pressures for between 1 and 48 hours. Dehydration can also be performed at lower temperature merely by placing the zeolite in a vacuum, but a longer time is required to obtain a particular degree of dehydration. The thermal decomposition product of the newly synthesized ZSM-12 can be prepared by heating same at a temperature up to about 600° C. for from 1 hour to about 48 hours.

As above mentioned, synthetic zeolite ZSM-12 prepared in accordance herewith can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange technique would be to contact the synthetic zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° C. to about 315° C. and thereafter may be calcined in air or other inert gas at temperatures ranging from about 200° C. to about 600° C. for periods of time ranging from 1 to 48 hours or more to produce a catalytically-active thermal decomposition product thereof.

Regardless of the cation replacing the alkali metal in the synthesized form of the zeolite ZSM-12, the spatial arrangement of the aluminum, silicon and oxygen atoms which form the basic crystal lattices of zeolite ZSM-12 remains essentially unchanged by the described replacement of alkali metal as determined by taking an X-ray powder diffraction pattern of the ion-exchanged material.

The crystalline silicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the zeolite ZSM-12 hereby prepared with another material resistant to the temperatures and other conditions employed in certain organic conversion processes. Such matrix materials include active and inactive materials and synthetic or naturally occurring zeolites as well as incorganic materials such as clays, silica and/or metal oxides, e.g. alumina. The latter may be either naturally occurring or in the form of gelatinous precipitates, sols or gels including mixtures of silica and metal oxides. Use of a material in conjuction with the zeolite ZSM-12, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized zeolite ZSM-12 include the montmorillonite and kaolin families which include the subbentonites, and the kaolins commonly known as Dixie, McNamee, Georgia and Florida Clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite ZSM-12 catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and inorganic oxide gel matrix vary widely with the crystalline silicate content ranging from about 1 to about 90 percent by weight, and more usually in the range of about 2 to about 50 percent by weight of the composite.

In general, organic compounds such as, for example, those selected from the group consisting of hydrocarbons, alcohols and ethers, are converted to conversion products such as, for example, aromatics and lower molecular weight hydrocarbons, over the catalytically active form of the composition of this invention by contact under organic compound conversion conditions including a temperature of from about 100° C. to about 800° C. a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by additon of adsorbate vapor controlled by a manostat during the adsorption period, which did not exceed about 8 hours. As adsorbate was adsorbed by the sorbant material, the decrease in pressure caused the manostat to open a valve which admitted more adsorbate vapor to the chamber to restore the above control pressures. Sorption was complete when the pressure change was not sufficient to activate the monostat. The increase in weight was calculated as the adsorption capacity of the sample in g/100 g of calcined adsorbant.

EXAMPLE 1

Sixteen grams of dibenzyldimethylammonium chloride was added to a solution containing 3.5 grams NaOH and 40.0 grams $H_2O$. The mixture was added to 190.0 grams colloidal silica (30% solution). The total was then thoroughly mixed. The mixture, which had the composition in mole ratios:

| added $Al_2O_3/SiO_2$ | = 0 |
| $H_2O/SiO_2$ | = 10.12 |
| $OH^-/SiO_2$ | = 0.046 |
| $M/SiO_2$ | = 0.046 |
| $R/SiO_2$ | = 0.064 | was then allowed to crystallize in a polypropylene jar under static conditions at 100° C. for 50 days. The product crystals were separated from the remaining mixture, filtered, washed with water and dried at 120° C.

The crystalline product was submitted for chemical analysis and X-ray diffraction analysis. Chemical analysis proved the composition of the product crystals to be as follows:

| 0.99 wt. % | N |
| 0.40 wt. % | Na |
| 760 ppm | $Al_2O_3$ |
| 84.8 wt. % | $SiO_2$ |
| 88.8 wt. % | Ash |
| 1897 | $SiO_2/Al_2O_3$ molar ratio |

The dried product gave the X-ray diffraction pattern of 80% crystalline ZSM-12 compared with a reference ZSM-12 material.

A quantity of the product of this example was calcined at 550° C. for 16 hours in air, and then tested for sorption properties. The results indicated:

3.9 wt. % cyclohexane sorbed,
3.5 wt. % n-hexane sorbed, and
2.6 wt. % water sorbed.

EXAMPLE 2

Two separate solutions were prepared to be composed of:

(A) 1.53 grams NaOH and 49.0 grams $H_2O$, and
(B) 20.4 grams dibenzyldimethylammonium and 30 grams $H_2O$.

Solutions A and B were then mixed together, and the mixture was added to 165 grams colloidal silica (30%). The total was then thoroughly mixed. The mixture, which had the composition in mole ratios:

| added $Al_2O_3/SiO_2$ | = 0 |
| $H_2O/SiO_2$ | = 13.13 |
| $OH^-/SiO_2$ | = 0.092 |
| $M/SiO_2$ | = 0.092 |
| $R/SiO_2$ | = 0.094 | was then allowed to crystallize in a polypropylene jar under static conditions at 150° C. for 7 days. The product crystals were separated from the remaining mixture, filtered, washed with water and dried at 120° C.

The crystalline product was submitted for chemical analysis and X-ray diffraction analysis. Chemical analysis proved the composition of the product crystals to be as follows:

| 0.59 wt. % | N |
| 0.16 wt. % | Na |
| 571 ppm | $Al_2O_3$ |
| 92.1 wt. % | $SiO_2$ |
| 91.2 wt. % | Ash |

| | |
|---|---|
| 2746 | SiO$_2$/Al$_2$O$_3$ molar ratio |

The X-ray results indicated a 90% crystalline ZSM-12 structure compared with the reference ZSM-12 material.

A quantity of the product of this example was calcined at 550° C. for 16 hours in air, and then tested for sorption properties. The results indicated:
- 7.8 wt. % cyclohexane sorbed,
- 6.3 wt. % n-hexane sorbed, and
- 1.5 wt. % water sorbed.

EXAMPLE 3

Dimethylbenzylamine, 6.8 grams, was added to 6.4 grams of benzylchloride. This mixture was added to a solution containing 1.2 grams NaOH in 85.0 grams H$_2$O. The combined solutions were added to 30.0 grams of colloidal silica (30%) and thoroughly mixed. The mixture, having the composition:

| | |
|---|---|
| added Al$_2$O$_3$/SiO$_2$ | = 0 |
| H$_2$O/SiO$_2$ | = 39.3 |
| OH$^-$/SiO$_2$ | = 0.2 |
| M/SiO$_2$ | = 0.2 |
| R/SiO$_2$ | = 0.34 | was heated at 160° C. for 39 days. The product give the X-ray diffraction pattern of ZSM-12 (95% crystallinity compared with the reference ZSM-12 standard).

After calcination for 16 hours at 550° C., the product of this example proved to have the following sorption properties:
- 5.2 wt. % cyclohexane sorbed,
- 7.0 wt. % n-hexane sorbed, and
- 3.5 wt. % water sorbed.

Chemical composition, wt. %, of the product crystals proved to be:

| | |
|---|---|
| 78.1 wt. % | SiO$_2$ |
| 0.40 wt. % | Al$_2$O$_3$ |
| 0.19 wt. % | Na |
| 1.00 wt. % | N |
| 80.41 wt. % | Ash |
| 332 | SiO$_2$/Al$_2$O$_3$ molar ratio |

What is claimed is:

1. A method for synthesizing a crystalline silicate ZSM-12 exhibiting a characteristic X-ray diffraction pattern as shown in Table 1 of the specification, which comprises (i) preparing a mixture capable of forming said crystalline silicate, said mixture containing sources of alkali metal cations, dibenzyldimethylammonium cations, an oxide of silicon and water and having a composition, in terms of mole ratios, within the following ranges:

| | |
|---|---|
| added Al$_2$O$_3$/SiO$_2$ | 0 |
| H$_2$O/SiO$_2$ | 5–50 |
| OH$^-$/SiO$_2$ | 0.03–0.4 |
| M/SiO$_2$ | 0.03–0.4 |
| R/SiO$_2$ | 0.05–1.0 | wherein M is said alkali metal cation and R is said dibenzyldimethylammonium cation, (ii) maintaining the mixture at a temperature of from about 80° C. to about 180° C. until crystals of the crystalline silicate are formed and (iii) recovering the crystalline silicate ZSM-12 from step (ii) said recovered crystalline silicate containing alkali metal and dibenzyldimethylammonium cations.

2. The method of claim 1 wherein said mixture has a composition, in terms of mole ratios, as follows:

| | |
|---|---|
| added Al$_2$O$_3$/SiO$_2$ | 0 |
| H$_2$O/SiO$_2$ | 10–40 |
| OH$^-$/SiO$_2$ | 0.04–0.2 |
| M/SiO$_2$ | 0.04–0.2 |
| R/SiO$_2$ | 0.06–0.4 |

3. The method of claim 1 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

4. The method of claim 2 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

5. The method of claim 3 wherein said replacing cation is hydrogen or a hydrogen precursor.

6. The method of claim 4 wherein said replacing cation is hydrogen or a hydrogen precursor.

7. The recovered crystalline silicate of claim 1.

8. The recovered crystalline silicate of claim 2.

9. The product dibenzyldimethylammonium-containing crystalline silicate of claim 3.

10. The product dibenzyldimethylammonium-containing crystalline silicate of claim 4.

11. The product dibenzyldimethylammonium-containing crystalline silicate of claim 5.

12. The product dibenzyldimethylammonium-containing crystalline silicate of claim 6.

13. Dibenzyldimethylammonium-containing ZSM-12.

* * * * *